Figure 1:
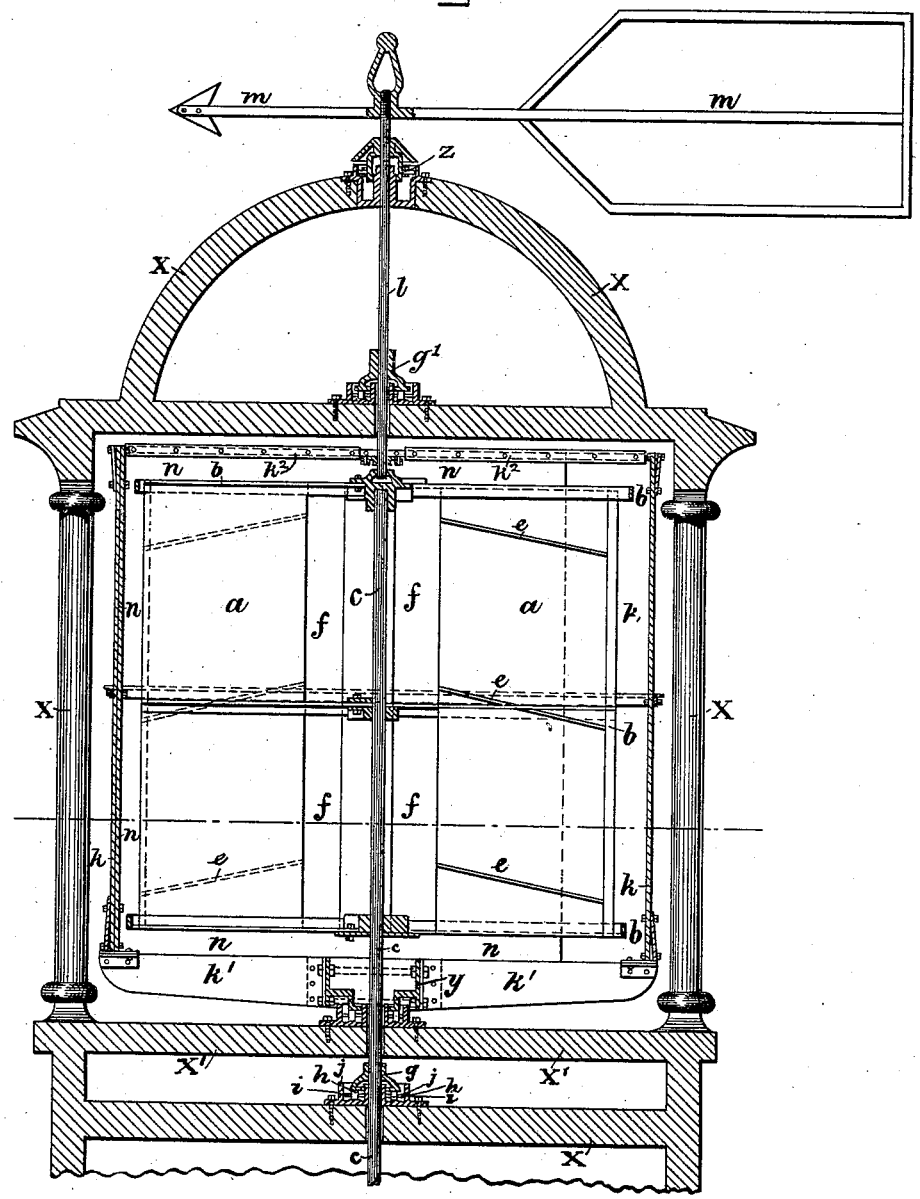

(No Model.)

S. J. ROLLASON.
WINDMILL OR WIND MOTOR.

No. 529,197.  
2 Sheets—Sheet 1.

Patented Nov. 13, 1894.

(No Model.) 2 Sheets—Sheet 2.
S. J. ROLLASON.
WINDMILL OR WIND MOTOR.
No. 529,197. Patented Nov. 13, 1894.
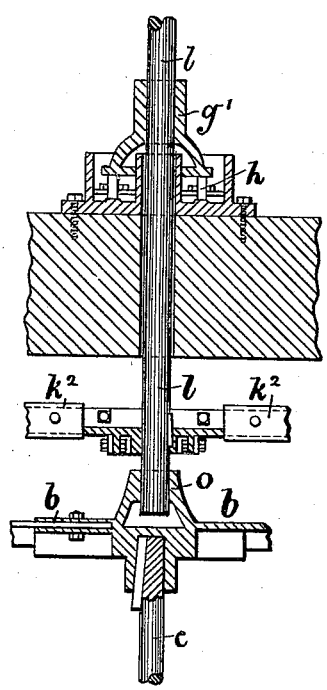
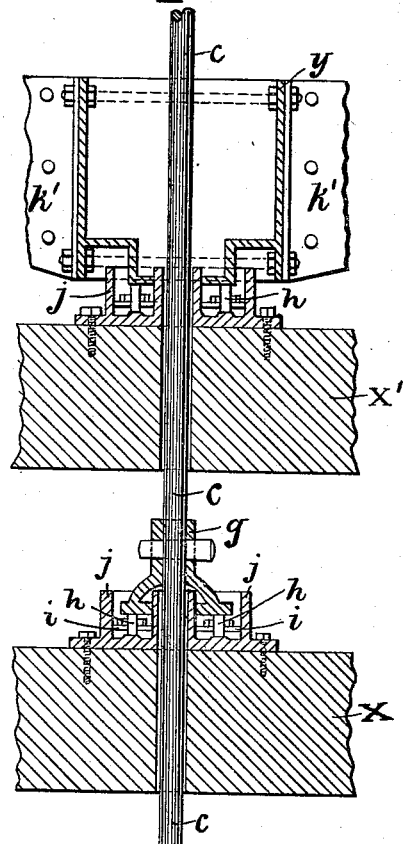
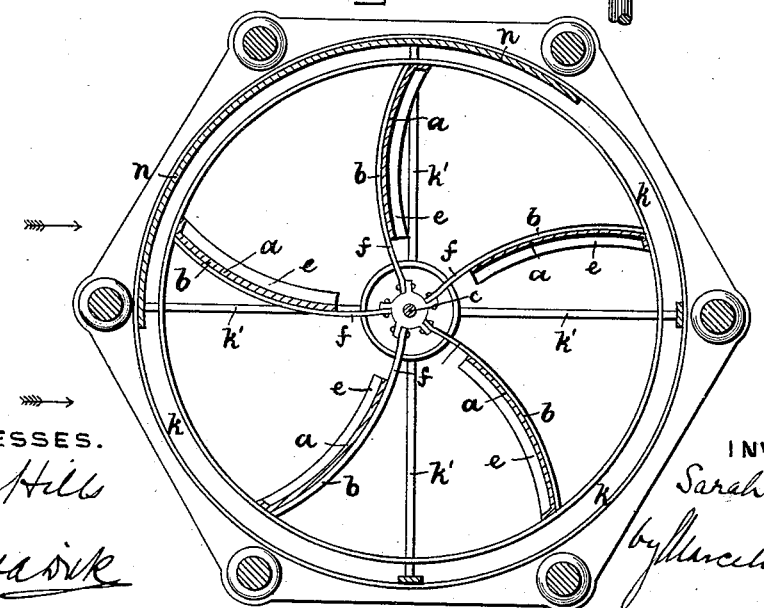
WITNESSES.
L. C. Hill
Ewella Dick
INVENTOR.
Sarah J. Rollason
by Marcellus Bailey
ATTORNEY.

UNITED STATES PATENT OFFICE.

SARAH JANE ROLLASON, OF LONDON, ENGLAND, ASSIGNOR TO WESTLEY HENRY FLETCHER, OF SAME PLACE.

WINDMILL OR WIND-MOTOR.

SPECIFICATION forming part of Letters Patent No. 529,197, dated November 13, 1894.

Application filed July 2, 1894. Serial No. 516,362. (No model.) Patented in England November 18, 1892, No. 20,988.

*To all whom it may concern:*

Be it known that I, SARAH JANE ROLLASON, gentlewoman, a subject of the Queen of Great Britain, residing at No. 50 Goldhurst Terrace, South Hampstead, London, in the county of Middlesex, England, have invented an Improved Windmill or Wind-Motor, (for which I have obtained a patent in Great Britain, No. 20,988, bearing date November 18, 1892,) of which the following is a specification.

This invention relates to improvements in wind-mills or wind motors. Fixed on the building is a wind wheel provided with sails rotating about a vertical axis. Half of the apparatus is protected by a shield (which is automatically regulated by the wind) to stop back resistance thereby bringing the whole force of the wind on the exposed portions of the sails. There is fixed to the spindle a wheel which may be geared for driving purposes to work a pumping, grinding or other machine.

In the accompanying drawings Figure 1 is a sectional elevation of an apparatus embodying my invention. Fig. 2 is a horizontal section of the same, the plane on which the section is taken, being indicated by the transverse dotted line in Fig. 1. Figs. 3 and 4 are vertical sectional views, on a somewhat larger scale than the other figures, illustrating respectively the upper and the lower bearings for the central shaft of the apparatus.

The sails $a$ Figs. 1 and 2 being made of wood or other suitable materials are preferably convex in form and are carried on curved arms $b$. See Figs. 1 and 2. The numbers required depend upon the size and strength of the apparatus. The arms $b$ are secured to iron bosses provided with lugs. The bosses being keyed or bolted at suitable distances on spindle $c$ the arms $b$, sails $a$ and spindle $c$ all rotate together when set in motion by the wind.

On the concave side of each sail $a$ there are secured a number of ridges $e$ Figs. 1 and 2 so as to lie at a small angle with the horizontal their upper ends pointing toward spindle C. I have found the addition of such ridges to be very advantageous and to give increased power in the working of the wind wheel.

The sails $a$ do not extend right up to the spindle $c$ but between it and the inner edge of each sail a considerable space $f$ is left for the wind to pass through.

The spindle $c$ carries the whole weight of the wind wheel with its sails and arms and passes clear through the center of the bearing which carries the weight of the shield and continues down through the sleeve $g$ and trough $j$ to take the wheel for driving. The sleeve $g$ is keyed or bolted to spindle $c$ Fig. 4 and rotates on rollers $h$ journaled in a plate $i$ in trough $j j$ which is bolted to the bottom cross piece X of the lower portion of the external framing. The trough $j$ is made deep enough to hold oil for the rollers to work in.

Around the outer edge of sails $a$ and inside the outer framework X is a round framework $k$ Figs. 1 and 2 supported and secured on four or more cross arms $k'$ bolted to bearings $y$ and carried on rollers $h$ in trough $j$, see Figs. 1 and 4, the trough $j$ being screwed down to cross piece X' Figs. 1 and 4. The top of the framework $k$ is connected by four or more arms $k^3$ Figs. 1 and 3 to a spindle $l$. The spindle $l$ is carried upward through the top of apparatus X and the vane $m$ is secured to spindle $l$. The framework $k$, spindle $l$, and vane $m$, revolve together.

The two sleeves Z and $g'$ carry the weight of the spindle and vane, in a similar manner to the sleeve $g$, which takes the weight of the wind-wheel and the sleeve Z takes the side thrust of the spindle and vane. The spindle $l$ passes clear through the troughs of Z, $g'$ and cross pieces of X down below framework $k^2$ to form a pivot or top center for the wind wheel. The bearing O (see Fig. 3) on the top of the wind wheel takes the end of spindle $l$ and this forms the top bearing of the wind wheel.

Fixed from bottom to top of framework $k$ are boards or other suitable materials to cover about a third of the distance round to form the shield for shielding half of the apparatus, see $n$ Figs. 1 and 2, to prevent the wind from striking the convex side of sails $a$ thus stopping back resistance.

The point of vane $m$ is set in a line with the edge of shield $n$ Fig. 2 so as to bring the whole force of the wind upon the concave portions of the sails.

The small arrow Fig. 2 denotes the direction the wind is supposed to be blowing thus showing the object of shielding half of the apparatus. As the direction of the wind changes the vane regulates the position of the shield and causes it to travel round sails $a$ until the point of vane $m$ faces the wind again. The weight of the shield and its spindle and vane is wholly taken by the bearings $y$ and $g'$ so that the friction of the bearing $g$ of the wind wheel is only that due to the weight of the wind wheel alone.

It will be seen that by placing the framing X which supports the moving parts outside both shield and wind wheel I am enabled to obtain a lower bearing for the shield as described. This outer framing may conveniently take the form of a turret and be placed on the loftiest part of a building.

The wheel on spindle $c$ is geared or arranged for driving purposes.

What I claim is—

1. A wind-wheel having concave sails $a$ to the faces of which are secured the ridges $e$, substantially as described.

2. A wind-wheel having a vertical spindle or shaft, and the concave sails $a$ carried thereby and provided with the ridges $e$, there being a considerable space $f$, left between the sails and the spindle or shaft, substantially as hereinbefore set forth.

SARAH JANE ROLLASON.

Witnesses:
FREDK. J. BINGHAM,
    54 *Fleet St., London.*
T. F. BARNES,
    17 *Gracechurch St., London.*